United States Patent [19]
Corless

[11] 3,805,871

[45]*Apr. 23, 1974

[54] TIRE MOUNTING, BEAD SEATING AND INFLATION APPARATUS AND METHOD OF USE

[75] Inventor: Lee M. Corless, Grosse Pointe Woods, Mich.

[73] Assignee: B & J Manufacturing Company, Glenwood, Ill.

[*] Notice: The portion of the term of this patent subsequent to Jan. 5, 1988, has been disclaimed.

[22] Filed: July 26, 1971

[21] Appl. No.: 165,913

Related U.S. Application Data

[63] Continuation-in-part of Ser. No. 89,952, Nov. 16, 1970, Pat. No. 3,675,705.

[52] U.S. Cl. ............................................. 157/1.1
[51] Int. Cl. ............................................ B60c 25/06
[58] Field of Search ........................... 157/1.1, 1.24

[56] References Cited
UNITED STATES PATENTS

| | | | |
|---|---|---|---|
| 3,238,989 | 3/1966 | Silvestrani | 157/1.24 |
| 3,552,469 | 1/1971 | Corless | 157/1.1 |
| 2,900,015 | 8/1959 | Harrison | 157/1.1 |

*Primary Examiner*—Granville Y. Custer, Jr.
*Attorney, Agent, or Firm*—Whittemore, Hulbert & Belknap

[57] ABSTRACT

Tire mounting, bead seating and inflation apparatus and the method for use thereof for mounting and inflating tubeless tires on a vehicle wheel is provided. The apparatus for seating the tire beads comprises an annular orifice structure having orifice means for injecting air under pressure peripherally around the tire through the space between a wheel rim and the lower tire bead. The orifice structure is incorporated into a tire mounting device which includes a base. The base includes means to receive vehicle tires, the orifice structure being provided on said means.

16 Claims, 7 Drawing Figures

PATENTED APR 23 1974 3,805,871

INVENTOR
LEE M. CORLESS
BY Whittemore, Hulbert
& Belknap
ATTORNEYS

PATENTED APR 23 1974 3,805,871

INVENTOR
LEE M. CORLESS

BY Whittemore
Hulbert & Belknap

ATTORNEYS

TIRE MOUNTING, BEAD SEATING AND INFLATION APPARATUS AND METHOD OF USE

CROSS-REFERENCE TO RELATED APPLICATION

The present application is a continuation-in-part of my copending application Ser. No. 89,952, filed Nov. 16, 1970 now U.S. Pat. No. 3,675,705.

BACKGROUND OF THE INVENTION

Inflation of tubeless tires on vehicle wheels has proved to be a problem. When a tubeless tire is mounted on a wheel, the sidewalls do not normally form sealing engagement with the rim of the wheel. Various mechanical techniques have been utilized in the past to bulge the sidewalls of the tire out and cause engagement of the tire beads with the wheel rim whereupon the tire may be inflated through the conventional tire valve. Such techniques have proved to be awkward and time consuming and have not been readily adaptable to some types of tires, such as radial ply and glassbelted tires.

In my U.S. Pat. No. 3,552,469, issued Jan. 5, 1971, I have disclosed apparatus for inflating tubeless tires which utilizes a simple annular tubular member having orifices spaced around the periphery thereof through which air is injected into a tire through the gap between the tire bead and wheel rim. The device does not employ any working parts which must slide or otherwise fit exactly on the tire or wheel. There is no wear of the parts and the problem of accurate dimensions is considerably reduced. The present invention provides a modified version of such structure wherein the bead seating structure is incorporated into a conventional tire mounting apparatus to facilitate use of a single station for mounting, de-mounting and inflation.

IN THE DRAWINGS

Figure 1:
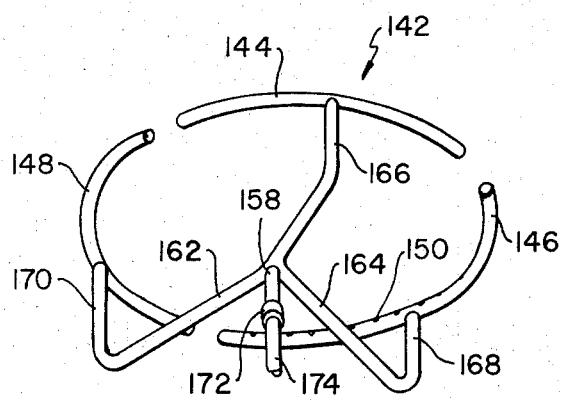
FIG. 1 is a perspective view of one embodiment of a segmented tire bead seater utilized in the tire mounting machines of FIGS. 2 and 3 in accordance with the present invention.

Referring to FIG. 1, the tire bead seater 142 comprises three arcuate tubular segments 144, 146, 148. The ends of each of these segments are plugged so that air cannot escape via the ends. Each segment is provided with a plurality of spaced apart orifices 150. The annular structure defined by the segments has a diameter somewhat larger than both the outer diameter of a vehicle wheel and the inner diameter of a vehicle tire. The bead seater 142 may service tires having some variation in inner diameters. The bead seater 142 may be fabricated from various materials such as metal, plastic or rubber. Further, it may be directly incorporated into the structure of a tire mounting machine. The bead seater 142 may be a cast element or it may be formed by bending lengths of tubing into the segments to define a circle.

The orifices 150 are provided in spaced apart relationship around the interior periphery of the segments. The orifices may be provided at, for example, 2 inch intervals, although other spacings are permissible depending upon the application, size of orifices, size of the overall circle and the like. Instead of circular openings as shown, a continuous or interrupted slit may be used to form the orifice means. Nozzles also may be utilized as orifice means. Preferably, an orifice is provided at each end of each segment.

Illustratively, the bead seater 142 is formed of three segments thus resulting in three gaps or spaces between the segments. More or fewer segments may be used as desired. The basic purpose of the gaps is to permit passage of the bead seater over obstructions which may be present on conventional tire mounting apparatus. The provision of three spaces in the present case is particularly adapted for use in connection with the tire mounting machine illustrated in FIGS. 2 and 3.

The bead seater 142 is structurally held together and supplied with air by means of a web-like structure which includes a center air supply tube 158 having three radially outwardly extending tubes 160, 162, 164 on the inner end thereof. Each of tubes 160, 162, 164 is joined to the center of a segment 144, 146, 148 by means of a short length of tube 166, 168, 170. All of the tubing thus described is of a rigid nature so as to provide strength. The tubes may be joined together as by welding or by brazing. It will be noted that the length of the tubes 166, 168, 170 permits insertion of the bead seater substantially beyond the rim of a wheel. The center tubular member 158 is provided with a nozzle 172 to which a flexible hose 174 is secured. The hose 174 is connected at the other end to a source of air under pressure (not shown).

Figure 2:
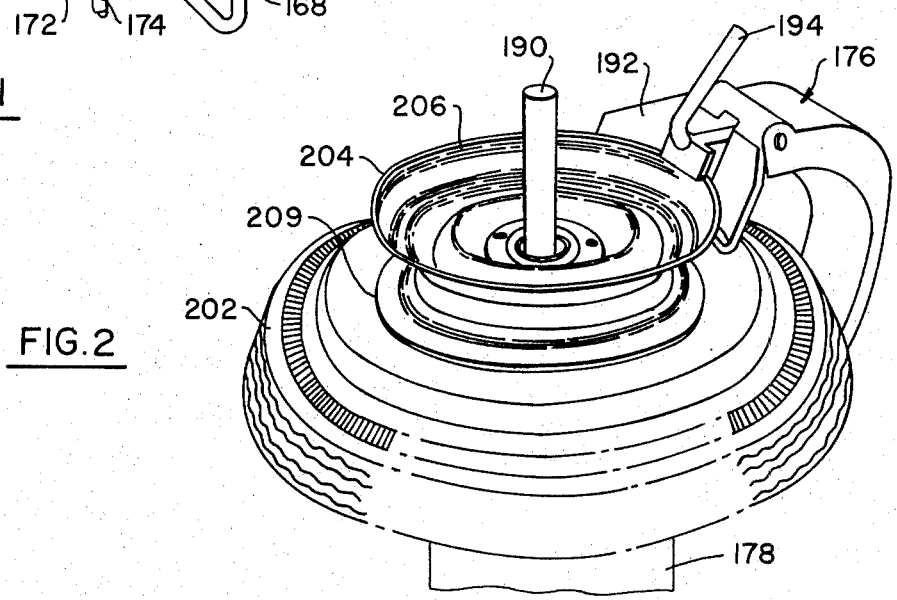
FIG. 2 is a view in perspective of a portion of a tire mounting machine with the tire bead seater of FIG. 1 incorporated thereinto.
Figure 3:
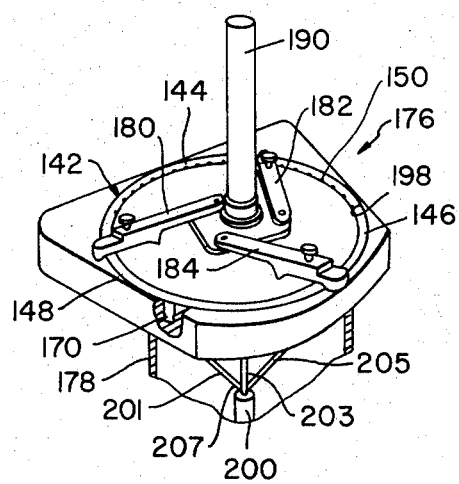
FIG. 3 is a perspective view of the machine of FIG. 2 with parts broken away to expose the tire bead seater.

FIGS. 2 and 3 illustrate the bead seater 142 incorporated into a conventional tire mounting apparatus. The apparatus 176 includes a base 178 which rests on a floor surface. Three peripherally spaced clamps 180, 182, 184 are provided on the upper surface of the base. The clamps are movable radially inwardly and outwardly by manipulation of a handle (not shown). The function of the clamps is to engage the lower rim portion of a wheel and hold the wheel in position during mounting and de-mounting of a tire therefrom. An upstanding power driven center post 190 is provided for driving an arm (not shown) used for forcing a tire bead over the wheel rim. The usual shoe structure 192 manipulatable by means of handle 194, is provided for bead breaking.

The bead seater 142 is mounted on the base 178 with the orifices 150 aimed inwardly. The bead seater is received in a discontinuous recess 198 with the tubular structure thereof located within the base. As will be noted, the spaces between the segments 144, 146, 148 fit around the clamp elements 180, 182, 184. During mounting and de-mounting of a tire on the wheel, the bead seater 142 is retracted downwardly so as to be out of the way. After the tire has been mounted and the clamps 180, 182, 184 and shoe structure 192 have been retracted, the bead seater 142, which is connected to a double-acting pneumatic cylinder 200, is extended upwardly over the rim of the wheel by actuation of the cylinder 200. Cylinder 200 has three rods 201, 203, 205 which extend from rod 207 into connection with the tubes 160, 162, 164. The tire 202 rests on the bead seater thus causing seating of the upper bead 209 of the tire against the upper rim 204 of the wheel 206. When air under pressure is supplied to the bead seater, the tire 202 will begin to inflate as previously described. As the tire is inflated, it will rise until the lower tire bead has seated against the lower wheel rim. Air is then injected through the usual tire valve provided on the wheel rim to completely inflate the tire. After the tire has been inflated, it is removed from the apparatus whereupon the cylinder 200 is actuated to retract the bead seater 142 and ready the apparatus for operation on another wheel and tire assembly.

The air jets which emanate from the orifices tend to spread as they move away from the bead seater. This spreading tends to link the air between the segments with the result that the final curtain of air is functionally continuous, that is, any gaps which exist do not affect operability. In addition to the spreading of the air jets, the jets are deflected and spread apart upon contact with the surfaces of the wheel and tire assembly. In essence, there must be sufficient orifice means so that air is injected into the tire in sufficient amounts, without using a mechanical seal, so that more air is injected into the tire than may escape.

Mechanically moving the bead seater 142 upwardly to cause seating of the upper bead with introduction of air under pressure past the lower bead is not strictly necessary. The bead seater 142 may be fixed to the base 178. In order to seat the beads by means of the bead seater 142, the tire is then manually lifted until the upper bead makes contact with the upper wheel rim whereupon air may be injected past the lower bead as described.

Figure 4:
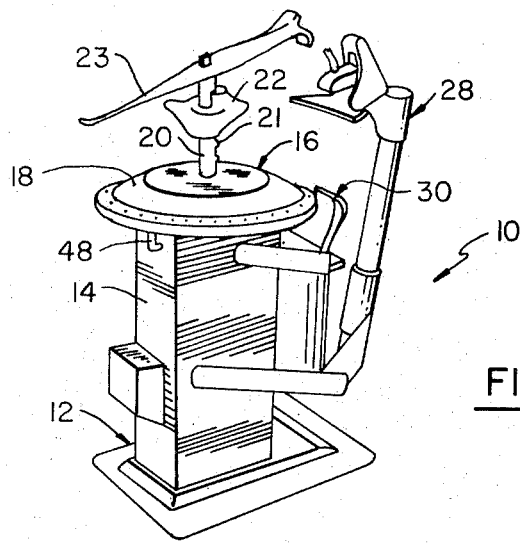
FIG. 4 is a perspective view of another type of a tire mounting machine with a modified annular tire bead seater incorporated thereinto.
Figure 5:
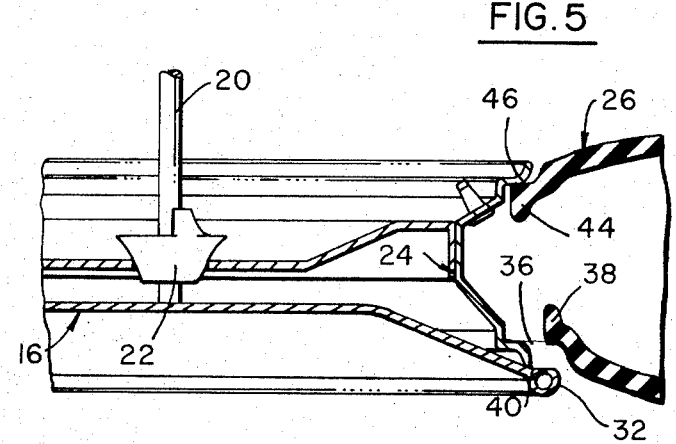
FIG. 5 is a sectional view of the center portion of the tire mounting machine of FIG. 4 with a wheel assembly including a tubeless tire in position for inflation.
Figure 6:
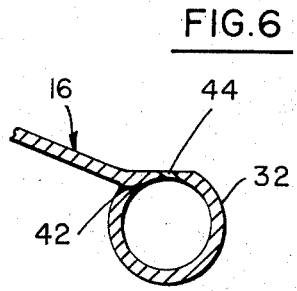
FIG. 6 is an enlarged view of the cross-section of the tire bead seater structure incorporated into the tire mounting machine of FIG. 4.

FIGS. 4, 5 and 6 illustrate incorporation of a bead seater into a tire mounting machine of somewhat different configuration than that illustrated in FIGS. 2 and 3. The tire mounting machine 10 comprises a base 12 which is supported on a floor surface and has an upstanding housing 14. A plate like shelf 16 is provided on the top of the housing 14. The center portion 18 of the shelf 16 is raised, the sides having a conical configuration. This permits firm seating of a wheel on the machine.

A center post 20 extends upwardly from the shelf 16 to receive a wheel. The post 20 has partial threads 21 to engage a rotatable locking element 22. The element 22 is removed from the post 20 when it is desired to place or remove a vehicle wheel 24 on the machine. The wheel 24 may have a tubeless tire 26 mounted thereon when it is received on the machine, as for example, when it is desired to mount a new tire onto the wheel rim or repair a flat tire. A swivally mounted bar-like conventional tire mounting-demounting tool 23 is receivable on post 20 for forcing a tire onto or off of a wheel.

The machine 10 is provided with upper and lower pneumatically operated bead breaking structures 28, 30. In order to remove an old tire, it is necessary to force the beads away from the wheel rim. The tire beads tend to stick to the wheel rim and it is necessary to apply relatively large forces in order to break the tire and wheel rim apart.

Incorporation of the bead seating structure of the present invention into the machine 10 is accomplished in a fashion to permit unobstructed operation of the lower bead breaking structure 30. The upper bead breaking structure 28 does not cause a problem because its location prevents interfering action with the bead seating structure. However, there is a possibility of interference in connection with the lower bead breaking structure 30. The design is such as to avoid interference.

FIGS. 5 and 6 illustrate the construction of the shelf 16. As will be noted, the shelf 16 comprises a plate member which is formed into the desired shape as, for example, by use of a punch press. The outer peripheral edges of the plate are curled over to define an annular tubular structure 32 which constitutes a passageway for movement of compressed air around the periphery of the shelf for seating of the bead of a non-inflated tubeless tire. As will be noted, a plurality of circumferentially spaced apart orifices 44 are provided for aiming jets of air under pressure upwardly and radially inwardly towards the gap 36 between the lower bead 38 of the tire 26 and the outer peripheral rim section 40. The tubular structure 32 is welded at 42 to make it airtight. As a consequence of integrating the tubular structure 32 into the shelf 16, the lower bead breaker 30 may follow its normal path in breaking a tire bead away from the wheel rim, which path is a short arc upwardly and radially inwardly.

As will be noted in FIG. 5, seating of the tire beads is accomplished by manually lifting the tire 26 upwardly whereupon the upper bead 44 will engage the upper wheel rim portion 46 leaving the gap 36 between the lower bead 38 and rim portion 40. Air under pressure is supplied to the interior of the tubular section 32 by means of an air line 48 (FIG. 4) which is connected to a source of air under pressure (not shown).

Figure 7:
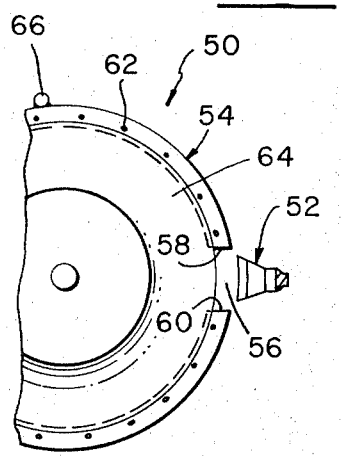
FIG. 7 is a top plan view of another embodiment of a tire mounting machine wherein a portion of the tire bead seater ring is segmented to permit passage of a bead breaker forming a part of the tire mounting machine.

FIG. 7 illustrates application of the bead seating structure to a tire mounting machine 50 in which the lower bead breaking structure 52 follows a straight line path in order to break the tire bead away from a wheel rim. In this case, there is insufficient clearance to permit the tubular bead seater 54 to be placed in an unobstructing position. Therefore, the bead seater 54 is not a continuous ring, a gap 56 being provided in alignment with the bead breaking structure 52. The ends 58, 60 are plugged so that air may not escape therefrom. The usual spaced apart orifices 62 are provided around the periphery of the bead seater 54 for aiming jets of air under pressure at the gap between a tubeless tire and wheel rim in the manner of FIG. 5. The tire mounting machine 50 includes a shelf structure 64 for supporting a wheel rim and tubeless tire. Air under pressure is supplied to the bead seater 54 via air line 66 which is connected to a source of air under pressure (not shown). The bead seater 54 is illustratively fastened to the outer peripheral edge of the shelf 64 as by welding. Thus, a standard tire mounting machine may be modified in accordance with the present invention without modifying the basic structure thereof.

In operation of the bead seating structure which is incorporated into the various tire mounting machines illustrated, it should be noted that no mechanical shield or other devices are provided for sealing the space between the wheel rim and tire sidewalls during inflation. The orifices illustrated result in providing a substantially continuous ring of air under pressure which, while it may have gaps, is still continuous enough so that more air will be injected than escapes with the result that the tire will be expanded to seat the beads and permit complete inflation. Relatively large gaps may be provided between the orifices. However, such gaps result in decreasing the efficiency of operation. Such efficiency may be increased when gaps are provided if the orifices are made relatively large thus permitting greater amounts of air to be expelled from the bead seater. It should be appreciated that the invention is adapted to be used in connection with the usual air pressure available at service centers which sell or repair vehicle tires, the normal pressure available being in the range of from 125 to 175 psi. In such use, the more continuous the ring of air, the easier it is to seat the tire beads. This is especially important in those cases where the tire sidewalls are stiff and hard to flex or where the tire sidewalls are limp or distorted so as to be relatively far from seating on the wheel rim prior to inflation.

It should also be noted as obvious that it is not necessary, in constructing a bead seater, to utilize an annular tubular ring or passageway with the orifices provided directly therein although this is the preferred form of the invention. For example, a central manifold may be provided with tubes or passageways radiating therefrom outwardly to supply air to orifices positioned around the periphery of a wheel to accomplish the same function as the annular tube does.

What I claim as my invention is:

1. Apparatus for inflating tubeless tires on a vehicle wheel having oppositely disposed rim portions comprising a tire mounting device including a base, means on said base to receive a vehicle wheel, clamp means for engaging the wheel, said device including means for mounting and de-mounting tires on a wheel held by said clamp means, tire bead seating apparatus on said base including an annular tube of larger outer diameter than the wheel to surround the lower rim of a wheel set onto the base, orifice means around the inner periphery of the tube for injecting a substantially continuous ring of air under pressure through the space between the wheel rim and the bead of a non-inflated tubeless tire mounted on the wheel and inlet means on the tube for supplying air under pressure to the interior of the tube.

2. Apparatus as defined in claim 1, further characterized in that said clamp means comprises a plurality of shiftable clamps on said base for engaging the lower rim portion of a wheel, said annular tube comprises a plurality of segments, each end of each segment being sealed, the gaps between the segments being of sufficient size to pass over said clamps but of insufficient size to prevent the formation of a substantially continuous ring of air under pressure, said inlet means on the tube including separate means for supplying air under pressure to the interior of each of the segments.

3. Apparatus as defined in claim 2, further characterized in the provision of power means to extend and retract the bead seater towards and away from the wheel and tire assembly.

4. Apparatus for inflating tubeless tires on a vehicle wheel having oppositely disposed rim portions, comprising a tire mounting device including a base, means on said base to receive a vehicle wheel, said device including means for mounting and de-mounting tires on a wheel, tire bead seating apparatus on said base including an annular orifice structure including orifice means provided around a periphery of larger diameter than the diameter of a wheel to surround the lower rim of a wheel set onto the base for injecting air under pressure around the periphery of the wheel through the space between the wheel rim and the bead of a non-inflated tubeless tire mounted on the wheel in sufficient amounts, without using a mechanical seal, so that more air will be injected into the tire than may escape with the result that the tire will be expanded to cause the tire beads to sufficiently close on the wheel rims to permit complete inflation through the conventional valve, and inlet means on said orifice structure for supplying air under pressure to the orifice means.

5. Apparatus as defined in claim 4, further characterized in that said orifice structure comprises an annular tube of larger outer diameter than a wheel to surround the lower rim of a wheel set onto the base, said orifice means being provided around the periphery of the tube.

6. Apparatus as defined in claim 5, further characterized in that said tire mounting device includes clamp means for engaging a vehicle wheel, said clamp means comprising a plurality of shiftable clamps on said base for engaging the lower rim portion of a wheel, said annular tube comprising a plurality of segments, each end of each segment being sealed, the gaps between the segments being of sufficient size to pass over said clamps, said inlet means including separate means for supplying air under pressure to the interior of each of the segments.

7. Apparatus as defined in claim 6, further characterized in the provision of power means to extend and retract the bead seater towards and away from a wheel and tire assembly.

8. Apparatus as defined in claim 4, further characterized in that said tire mounting device includes movable bead breaking structure operable for movement towards the upper portion of said base to engage a wheel lower rim and tire sidewall to break the tire sidewall away from the wheel rim, said orifice structure comprising a ring-like tubular passageway of larger outer diameter than a wheel to surround the lower rim of a wheel set onto the base, said orifice means being provided around the inner periphery of the passageway, said passageway being discontinuous in the area of said bead breaking structure to define a gap for the passage of said bead breaking structure into engagement with a wheel and tire assembly.

9. Apparatus as defined in claim 4, further characterized in that said tire mounting device includes a shelf structure on top of the base for receiving a vehicle wheel, said shelf structure including a peripheral annular passageway defining said orifice structure, said passageway being of larger outer diameter than a wheel to surround the lower rim of a wheel set onto the shelf structure, said orifice means being provided in said passageway.

10. The method of inflating a tubeless tire on a vehicle wheel comprising the steps of mounting a vehicle wheel and non-inflated tubeless tire assembly on a support surface of a tire mounting device, injecting air under pressure into the tire peripherally around the wheel through the space between the wheel rim and the tire bead adjacent the support surface in sufficient amounts, without using a mechanical seal, so that more air is injected into the tire than may escape with the result that the tire is expanded to cause the tire beads to sufficiently close on the wheel rims to permit complete inflation through the conventional tire valve, and then completely inflating the tire by injecting air under pressure through the conventional tire valve.

11. The method as defined in claim 10, further characterized in the step of, prior to the injection of air, lifting the tire on the wheel to a position where the other tire bead makes contact with the adjacent wheel rim.

12. Apparatus for inflating tubeless tires on a vehicle wheel having oppositely disposed rim portions, comprising a tire mounting device including a base, means on said base to receive a vehicle wheel, said device including means for mounting and de-mounting tires on a wheel, tire bead seating apparatus on said base including an orifice for injecting air under pressure through the space between the wheel rim and the bead of a non-inflated tubeless tire mounted on the wheel in sufficient mounts, without using a mechanical seal, so that more air will be injected into the tire than may escape with the result that the tire will be expanded to cause the tire beads to sufficiently close on the wheel rims to permit complete inflation through the conventional valve, and inlet means on said orifice structure for supplying air under pressure to the orifice means.

13. The method of inflating a tubeless tire on a vehicle wheel comprising the steps of mounting a vehicle wheel and non-inflated tubeless tire assembly on a support surface of a tire mounting device, injecting air under pressure into the tire through the space between the wheel rim and the tire bead adjacent the support surface in sufficient amounts, without using a mechanical seal, so that more air is injected into the tire than may escape with the result that the tire is expanded to cause the tire beads to sufficiently close on the wheel rims to permit complete inflation through the conventional tire valve, and then completely inflating the tire by injecting air under pressure through the conventional tire valve.

14. Apparatus for seating the bead of a tubeless tire on the rim of a wheel and inflating the tire comprising:

a. a plenum in the form of a discontinuous ring having an inlet for receiving air under relatively high pressure therein;
b. a plurality of jets in communication with said plenum for forming relatively high velocity jets of air emanating from said plenum; and
c. said jets being positioned for directing said jets of air into the tire between the rim and the bead.

15. Apparatus for seating the bead of a tubeless tire on the rim of a wheel and inflating the tire as set forth in claim 14 wherein the plenum is at least partially arcuate and the jets are in communication therewith over at least one arcuate portion.

16. Apparatus for seating the bead of a tubeless tire on the rim of a wheel and inflating the tire as set forth in claim 14 wherein at least 12 jets are included.

* * * * *